United States Patent [19]

Vanderhoof

[11] 4,089,408
[45] May 16, 1978

[54] QUICK-CHANGE ROD ASSEMBLY FOR CONVEYOR

[75] Inventor: Frank B. Vanderhoof, Lake Forest, N.J.

[73] Assignee: Metramatic Corp., Landing, N.J.

[21] Appl. No.: 734,991

[22] Filed: Oct. 22, 1976

[51] Int. Cl.² ............................................. B65G 17/12
[52] U.S. Cl. ................................... 198/848; 198/440; 198/844
[58] Field of Search ............... 198/844, 848, 851, 853, 198/779, 440; 193/37

[56] References Cited

U.S. PATENT DOCUMENTS

| 2,881,903 | 4/1959 | Ahlen | 198/779 |
| 3,061,077 | 10/1962 | Noffsinger | 198/844 |
| 3,735,867 | 5/1973 | Vanderhoof et al. | 198/844 |
| 3,934,712 | 1/1976 | Jende | 198/848 |
| 4,003,466 | 1/1977 | Muth et al. | 198/779 |

FOREIGN PATENT DOCUMENTS

| 630,202 | 11/1927 | France | 198/844 |
| 1,101,274 | 3/1961 | Germany | 198/844 |
| 2,215,342 | 10/1973 | Germany | 193/37 |
| 2,324,256 | 12/1974 | Germany | 193/37 |
| 417,800 | 10/1934 | United Kingdom | 198/851 |
| 721,704 | 1/1955 | United Kingdom | 198/779 |

*Primary Examiner*—Evon C. Blunk
*Assistant Examiner*—Richard K. Thomson

[57] ABSTRACT

A round rod is supported at its ends by the parallel runs of two sprocket chains used in a conveyer. In order to permit easy replacement of a rod when damaged, the rod is equipped with spring biased means for holding the rod captive on the conveyer chain runs during normal use and for permitting the rod to be quickly snapped out without necessity of disassembling the conveyer chains or their protective shield.

4 Claims, 2 Drawing Figures

QUICK-CHANGE ROD ASSEMBLY FOR CONVEYOR

BRIEF SUMMARY OF INVENTION

Conveyer distributors having rods which move along a delivery path between two parallel runs of conveyer chain are quite common. The instant invention was developed in connection with such rod conveyers in which carriers, on which articles ride, slide on the rods to different transverse positions, so as to deliver said articles to different destinations. The Vanderhoof U.S. Pat. Nos. 3,511,357 and 3,791,518, and the Vanderhoof et al U.S. Pat. No. 3,735,867, disclose such conveyers.

Since the carriers slide on the rods, and also carry loads, it is imperative to replace a bent rod promptly. In the past, this has required a partial disassembly of the conveyer in order to spread the conveyer chains to permit removal of a rod from therebetween.

In the instant invention, the rods are hollow, and one end of each rod is impaled on a cooperating stud carried by one of the conveyer belt runs while the other end of the hollow rod carries a concentric outwardly biased retractable pin for engaging within a cooperating hollow rivet on the other run of conveyer chain.

VIEW OF DRAWING

FIG. 1 of the drawings sets forth, in fragmentary compressed and partly exploded cross-section, the construction of the invention roll.

FIG. 2 shows how the inventive rod of FIG. 1 is used in a conveyor of the type disclosed in the above referred to patent to Vanderhoof et al, U.S. Pat. No. 3,735,867.

DETAILED DESCRIPTION

Figure 1:
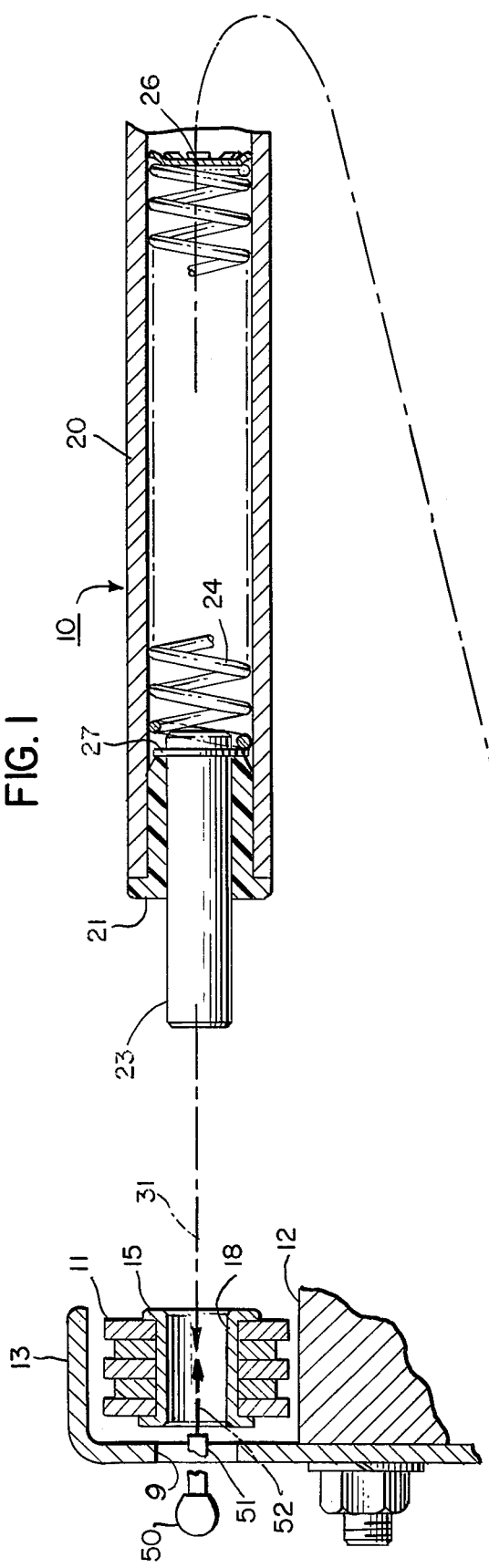

Referring to FIG. 1 of the drawings, the two runs of conveyer chain 11, seen in cross section on the upper left and lower right, are spaced apart a considerable distance, which is spanned by a series of rods 10, one of which is shown in the figure. As indicated by the z-shaped center line of the drawing, which represents an actual straight center line, the two chains 11 would be opposite each other rather than staggered as shown in the compressed drawing.

Each of the conveyer chains 11 rides on an individual rail 12 and is provided with a respective guard 13. The left guard is provided with elongated slots 9 proximate to the centerline of the left chain 11.

The links of the left conveyor chain 11 are held together by hollow rivets 15, each providing a through bore 18. The links of the right conveyor chain are held together by the rivets 16, each of which has an associated stud 17.

Each roller 10 is supported by the associated bore 18 and associated stud 17.

The roller 10 consists of a hollow cylindrical stainless steel tube 20 having identical bushings 21 of nylon, press fitted into its two ends.

Within the left bushing 21 slides a retractable pin 23, strongly biased outwardly by a spring 24. The retractable pin 23 is not capable of being expelled by the spring 24 because of the presence of a snap washer 27, which is retained in a groove near the right end of the pin 23. The right end of the spring 24 bears against a disc washer 26 which is retained by the locking pressure of its spring fingers after having been inserted into the tube 20 from the right end thereof.

The rod 10 is attached to the conveyer chains 11 by first sliding the right bushing 21 over the stud 17 until the right bushing 21 touches the rivet 15. The retractable pin 23 is then pushed into the tube 20 (compressing the spring 24) until the outer end of the pin is flush with the outer face of the left bushing 21. Under that circumstance the rod 10 can be swung into position between the right and left chains. The left bushing 21 is then positioned to be in axial alignment with the hollow rivet 15, permitting the spring 24 to expand and insert the retractable pin 23 into the bore 18 with the outer faces of the bushings 21 proximate to the links of both conveyer chains 11.

The procedure for removing a bent rod is essentially the reverse of what has already been described. A rod-like tool 51, having a handle 50, is applied through an elongated slot 9 (or at a point where the guard 13 is not present) to the outer end of a retractable pin 23 and the tool is pushed, in the direction shown by arrow 52, through the bore 18 of the hollow rivot 15 (forcing the retractable pin to compress the spring 24) until the outer end of the pin enters the left bushing 21. Under these circumstances, the left end of the rod can be swung up or down out of alignment with the left chain and the rod 10 can be pulled off the stud 17 and removed.

Figure 2:
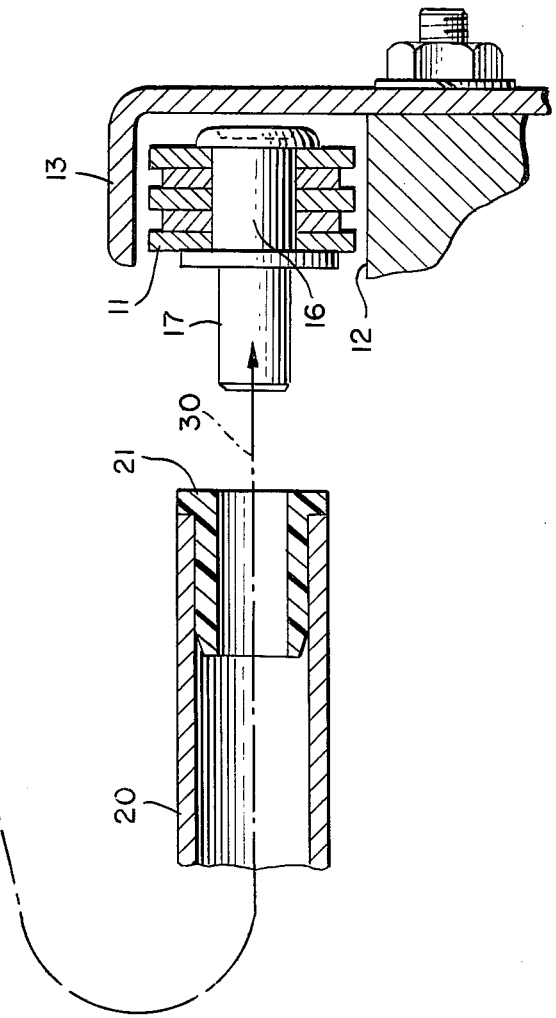
Figure 2:
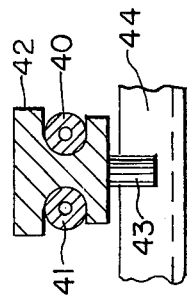

FIG. 2 shows how the inventive rod of FIG. 1 is used in, for example, the switching conveyor disclosed in the above identified patent to Vanderhoof et al, U.S. Pat. No. 3,735,867. The carrier 42 slidingly rides on two inventive rods 40 and 41. Cam action between pin 43, which acts as a cam follower, and member 44, which acts as a cam follower, and member 44, which acts as a cam, causes the carrier 42 to slide on the rods 40 and 41.

In a variation of the instant structure a blind rivet 15 may be used on the left chain 11, in which case the tube 20 is shortened by an amount corresponding to the projecting length of the stud 17. In such structure, it is to be noted that the spring 24 must be stiff enough to resist such sideways thrust as develops during ordinary operation without compressing in order to prevent the rod 10 from being unintentionally released, release being effected by pushing the tube 20 to the left until the right bushing 21 clears the stud 17.

The instant quick-change rod has great economic advantages over the prior art rod, since a workman at the conveyer may make a rod change and a mechanic need not be called to make the change.

I claim:

1. In a conveyer switching system having two parallel conveyer chains carrying a rod supported at its ends by respective ones of said conveyer chains, a plurality of said rods providing a moving support when said respective chains are in motion, said plurality of rods supporting carriers which guide and control articles which are to be conveyed and switched, said carriers being adapted to be slid on said rods in a direction, transverse to the run of said conveyer chains, along the length of said rods, the improvement comprising:

said rod having at each of its ends individual means for telescopically cooperating with a corresponding supporting member carried by the respective conveyer chain, to thereby support said rod between said conveyer chains;

one of said individual means for telescopically cooperating comprising a pin moveable with respect to said rod between a position wherein it protrudes from the body of said rod and a position wherein it is withdrawn into the body of said rod and further comprising stop means to hold said pin captive to said rod for movement only between said positions; and spring biasing means carried by said rod for moving said pin into operative relationship with said corresponding supporting member;

whereby when said spring biasing means is overcome, said operative relationship ceases, and said rod can be removed from said conveyer chains;

said rod substantially bridging the span between said supporting members carried by the respective conveyer chains, whereby any force components on said rod parallel thereto are transmitted directly from said rod to said corresponding supporting members by abuttment of said rod against one of said supporting members; and manual means to overcome said spring bias to release said rod from locking relationship, said manual means to overcome said spring bias being incapable of self actuation or actuation by said conveyer switching system.

2. For use in a conveyer switching system having two parallel conveyer chains, one of said conveyer chains carrying a first support means having a stud projecting towards said other chain;

said other chain carrying a second support means having a hole therethrough;

said stud and said hole being coaxial;

a rod carried by said conveyer chains, said rod comprising:

a tube of length substantially bridging the span between said conveyer chains when mounted coaxially with said stud and hole, the interior diameter of said tube being of such size as to have one end adapted to telescopically slip over said stud;

the other end of said tube having a pin fitted within said bushing and adapted to slide longitudinally within said bushing so as to extend for varying distances beyond said other end of said tube, said pin being of a diameter to be received within said hole;

spring means anchored within said tube and acting to normally push said pin out beyond said other end of said tube yet yieldingly permitting said pin to be pushed into said other end of the tube till the protruding end of said pin is flush with said other end;

whereby said tube can be assembled to said conveyer chains by centering said one end over said stud, swinging the said other end of said tube about said stud, while the pin is retracted, so that the tube and pin are coaxial with the axis of the said hole and said stud, and then releasing the pin to permit it to seat within said hole and whereby said tube can be removed from said conveyer chains by retracting said pin till it clears said hole and then swinging the rod about said stud and withdrawing said rod from said conveyer chains.

3. In combination:

two conveyer chains having parallel runs, whereby one run is the mirror image of the other;

two support members carried by respective one of said conveyer chains in symmetric positions, whereby one support member is located in a position which is the mirror image of the position of the other support member;

each support member providing a working face which faces that of the other support member;

a cylindrical stud protruding from the working face of one of said support members and a cylindrical hole in said other support member, extending to the working face thereof, said cylindrical stud and said cylindrical hole being in coaxial alignment; and a quick-change rod for use between said support members, said rod comprising:

a tube of uniform internal and external diameter;

two bushings, each having an external shoulder, located inside and at the ends of said tube so that the external shoulders of said bushings seat on respective ends of said tube;

the overall length of said tube with bushings attached closely fitting the space between said working faces, whereby said tube can be placed between said working faces, in a position transverse to said parallel runs;

one of said bushings having a bore which closely fits said cylindrical stud;

the other of said bushings having a bore of the same diameter as said cylindrical hole;

a cylindrical pin closely fitting the bore of said other bushing and sliding therein between two positions, in one of which it protrudes from the bushing and in the other of which it is withdrawn into the bushing;

spring biasing means to propel said pin from its withdrawn to its protruded position;

means to hold said pin captive so that it cannot be completely expelled from said bushing;

whereby said quick-change rod can be readily assembled to said two conveyer chains by impaling said one of said bushings on said cylindrical stud until said one bushing abuts against the working face of said one support member, withdrawing said pin into said other bushing against the force of said spring biasing means, moving the said other bushing so that the pin therein is aligned with the said hole in said other supporting member, and permitting said spring biasing means to propel said pin into supporting and locking relationship with said hole; and whereby said quick-change rod can be readily removed from said two conveyer chains by pushing said pin into its withdrawn position to release the rod from locked relationship to said two conveyer chains.

4. The combination of claim 3 in which said two bushings and said hole have the same diameter.

* * * * *